(12) United States Patent
Park et al.

(10) Patent No.: US 9,082,578 B2
(45) Date of Patent: Jul. 14, 2015

(54) ELECTRON EMISSION ELEMENT AND METHOD FOR MANUFACTURING THE SAME

(71) Applicant: Intellectual Discovery Co., Ltd., Seoul (KR)

(72) Inventors: Jin Seok Park, Ansan-si (KR); Bu Jong Kim, Ansan-si (KR); Won Kim, Ansan-si (KR); Sang Hyuk Lee, Ansan-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 148 days.

(21) Appl. No.: 13/868,170

(22) Filed: Apr. 23, 2013

(65) Prior Publication Data

US 2014/0292180 A1    Oct. 2, 2014

(30) Foreign Application Priority Data

Mar. 27, 2013    (KR) .......................... 10-2013-0033107

(51) Int. Cl.
| | | |
|---|---|---|
| *H01J 1/02* | (2006.01) | |
| *H01J 1/304* | (2006.01) | |
| *H01J 9/02* | (2006.01) | |
| *B82Y 30/00* | (2011.01) | |
| *B82Y 40/00* | (2011.01) | |

(52) U.S. Cl.
CPC ............... *H01J 1/3044* (2013.01); *H01J 9/025* (2013.01); *B82Y 30/00* (2013.01); *B82Y 40/00* (2013.01); *H01J 2201/30411* (2013.01); *H01J 2201/30434* (2013.01); *Y10S 977/842* (2013.01); *Y10S 977/939* (2013.01)

(58) Field of Classification Search
CPC .......... B82Y 30/00; H01J 1/3044; H01J 9/00
USPC .......................................... 313/309, 336, 351
See application file for complete search history.

(56) References Cited

PUBLICATIONS

Jong-Pil Kim et al., "Enhancement of electron emission and long-term stability of tip-type carbon nanotube field emitters via lithium coating" Thin Solid Films, 528 (2013) 242-246 (Publication Date: Nov. 6, 2012).

J.S. Park et al., "Enhancement of electron emission and long-term stability of tip-type carbon nanotube field emitters via lithium coating", Program Technical Sessions Abstracts Exhibition, International Conference on Metallurgical Coating & thin Films, Town & Country Resort Hotel and Convention Center San Diego, California, USA (Publication Date: Apr. 23, 2012).

*Primary Examiner* — Vip Patel
(74) *Attorney, Agent, or Firm* — Lexyoume IP Meister, PLLC (57) ABSTRACT

An electron emission device and a method of manufacturing the same are provided. The electron emission device includes: i) a substrate including a metal tip; ii) carbon nano tubes that are positioned on the metal tip; and iii) a lithium layer that is positioned on the carbon nano tubes.

15 Claims, 11 Drawing Sheets

ELECTRON EMISSION ELEMENT AND METHOD FOR MANUFACTURING THE SAME

CROSS-REFERENCE TO RELATED APPLICATION

This application is related to Korean Patent Application No. 2013-0033107 that was filed in the Korean Industrial Property Office on Mar. 27, 2013, "Enhancement of electron-emission and long-term stability in tip-type carbon nanotube field emitters by lithium coating", which is a material that was announced at the 39th ICMC on Apr. 23, 2012, and "Enhancement of electron emission and long-term stability of tip-type carbon nanotube field emitters via lithium coating", which is a thesis that was issued on Nov. 6, 2012.

BACKGROUND OF THE INVENTION (a) Field of the Invention

The present invention relates to an electron emission device and a method of manufacturing the same. More particularly, the present invention relates to an electron emission device and a method of manufacturing the same that embody a high current density and a high electron emission degree by coating lithium.

(b) Description of the Related Art

Due to excellent electric characteristics, mechanical characteristics, and chemical characteristics of a carbon nano tube, the carbon nano tube is widely used as an electron emission source in a field of an X-ray tube, a fluorescent tube, and a flat plate display. Conventionally, an X-ray tube using a thermal electron emission source such as a tungsten filament has been widely used, but a much production cost is required, operation is performed in a high temperature condition, and power consumption is large. Particularly, because upon applying as a micro focusing X-ray electron source, it is difficult to form the X-ray tube in a small size and the X-ray tube is less used due to a short life-span.

As a general electron emission source, a structure that forms a buffer layer in a metal tip that is formed with tungsten and that forms a catalyst material and that grows a carbon nano tube is much used. In such a structure, because of multi-layered structural characteristics, the structure has large contact resistance, thereby the large contact resistance becomes a cause that reduces a voltage supply for electron emission and therefore when the X-ray tube operates in a high pressure for a long time, a much heat occurs and adhesion is thus deteriorated. Therefore, important characteristics of a threshold voltage, a maximum emission current, reliability, and a life-span are deteriorated.

SUMMARY OF THE INVENTION

The present invention has been made in an effort to provide an electron emission device having advantages of a high current density and electron emission degree by coating lithium. The present invention has been made in an effort to further provide a method of manufacturing the electron emission device.

An exemplary embodiment of the present invention provides an electron emission device including: i) a substrate including a metal tip; ii) carbon nano tubes that are positioned on the metal tip; and iii) a lithium layer that is positioned on the carbon nano tubes.

The lithium layer may have an average thickness of 4 nm to 5 nm. Preferably, the lithium layer may have an average thickness of 4.6 nm to 4.7 nm. A thickness of the lithium layer may have a minimum value in a front end portion of the metal tip.

The carbon nano tubes may have a diameter of 10 nm to 15 nm, when the carbon nano tubes are a multi-walled carbon nano tube. The carbon nano tubes may have a diameter of 1 nm to 2 nm, when the carbon nano tubes are a single wall carbon nano tube. The metal tip may have an average diameter of 400 nm to 600 nm.

Another embodiment of the present invention provides a method of manufacturing an electron emission device, the method including: i) providing a substrate including a metal tip; ii) electrochemically etching the substrate; iii) providing carbon nano tubes on the substrate using electrophoretic deposition (EPD); and iv) plating the carbon nano tubes with lithium.

The plating of the carbon nano tubes with lithium may include i) providing a plating solution including ethylene carbonate (EC), diethyl carbonate (DEC), and lithium hexafluorophosphate ($LiPF_6$); ii) dipping a substrate in which the carbon nano tubes are provided in the plating solution and providing the substrate as a negative electrode; iii) dipping a positive electrode including lithium in the plating solution; and iv) applying a voltage to the positive electrode and the substrate and plating the substrate with lithium. At the plating of the substrate with lithium, a distance between the positive electrode and the substrate may be 10 mm to 30 mm, and the voltage may be 3V to 5V. A thickness of a lithium layer that is formed by plating with the lithium may be proportional to the voltage applied time. The voltage applied time may be 3 seconds or less. Preferably, the voltage applied time may be 2 seconds or less. An increase rate of a thickness of the lithium layer may be 3 nm/s to 6 nm/s.

By coating lithium at a carbon nano tube, a work function of an electron emission device is lowered and thus an electric field turn-on electric field can be reduced. As a result, an emission current greatly increases and thus damage of a structural aspect ratio of a carbon nano tube can be reduced. Further, because a lithium layer protects a surface of the carbon nano tube upon electric field emission, even when the carbon nano tube is used for a long time, a surface thereof can be prevented from being damaged. As a result, because a cold cathode for a ultra-small high resolution X-ray system can be produced, a low turn-on voltage, a high emission current, and stability for a long time can be secured.

DETAILED DESCRIPTION OF THE EMBODIMENTS

When it is said that any part is positioned "on" another part, it means the part is directly on the other part or above the other part with at least one intermediate part. In contrast, if any part is said to be positioned "directly on" another part, it means that there is no intermediate part between the two parts.

Technical terms used here are to only describe a specific exemplary embodiment and are not intended to limit the present invention. Singular forms used here include a plurality of forms unless phrases explicitly represent an opposite meaning. A meaning of "comprising" used in a specification embodies a specific characteristic, area, integer, step, operation, element and/or component and does not exclude presence or addition of another characteristic, area, integer, step, operation, element, component and/or group.

Terms representing relative space of "low" and "upper" may be used for more easily describing a relationship to another portion of a portion shown in the drawings. Such terms are intended to include other meanings or operations of an using apparatus together with a meaning that is intended in the drawings. For example, when an apparatus is inverted in the drawings, any portion described as disposed at a "low" portion of other portions is described as being disposed at an "upper" portion of other portions. Therefore, an illustrative term of "low" includes entire upper and lower directions. An apparatus may rotate by 90° or another angle, and a term representing relative space is accordingly analyzed.

Although not differently defined, entire terms including a technical term and a scientific term used here have the same meaning as a meaning that may be generally understood by a person of common skill in the art. It is additionally analyzed that terms defined in a generally used dictionary have a meaning corresponding to a related technology document and presently disclosed contents and are not analyzed as an ideal or very official meaning unless stated otherwise.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
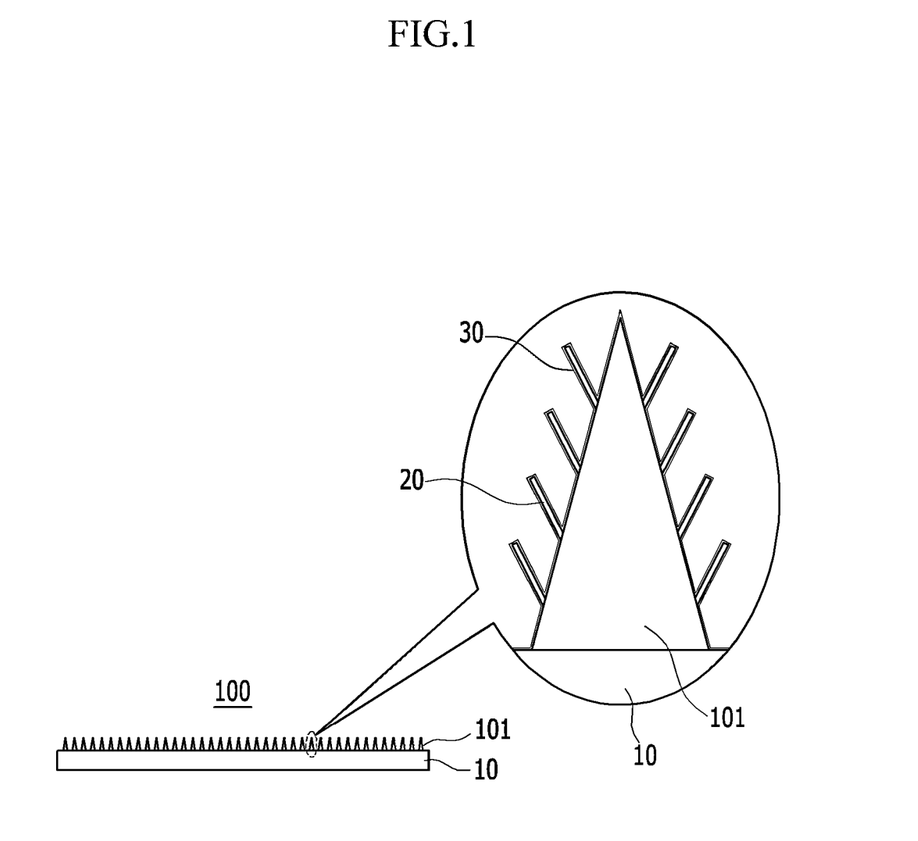
FIG. 1 is a diagram illustrating an electron emission device according to an exemplary embodiment of the present invention.

FIG. 1 is a diagram illustrating an electron emission device 100 according to an exemplary embodiment of the present invention. An enlarged circle of FIG. 1 illustrates a metal tip 101 that is included in the electron emission device 100. A structure of the electron emission device 100 of FIG. 1 merely illustrates the present invention and the present invention is not limited thereto. Therefore, the electron emission device may be changed to other forms.

As shown in FIG. 1, the electron emission device 100 includes a substrate 10, a metal tip 101, a carbon nano tube 20, and a lithium layer 30. In addition, the electron emission device 100 may further include other elements, as needed.

The substrate 10 includes a metal tip 101. The metal tip 101 may be made of tungsten W. The carbon nano tubes 20 are positioned on the metal tip 101. The lithium layer 30 is positioned on the carbon nano tubes 20. In more detail, the lithium layer 30 covers the substrate 10 including the metal tip 101 and the carbon nano tubes 20.

Here, an average thickness of the lithium layer 30 may be 4 nm to 5 nm. If the average thickness of the lithium layer 30 is too small, there is a problem that a coating effect of the lithium layer is slight. In addition, if the average thickness of the lithium layer 30 is too large, an aspect ratio of the carbon nano tube decreases. Therefore, the average thickness of the lithium layer 30 is adjusted to the foregoing range. More preferably, the average thickness of the lithium layer 30 may be 4.6 nm to 4.7 nm.

A thickness of the lithium layer 30 has a minimum value in a front end portion of the metal tip 101. Therefore, a thickness of the lithium layer 30 is minimized in a front end portion of the metal tip 101. That is, because the front end portion of the metal tip 101 has a sharp shape, a thickness of the lithium layer 30 is minimized.

Meanwhile, as the carbon nano tube 20 that is shown in an enlarged circle of FIG. 1, a multi-walled carbon nano tube may be used. A diameter of the multi-walled carbon nano tube may be 10 nm to 15 nm. When a diameter of the multi-walled carbon nano tube is too large, an aspect ratio thereof is deteriorated and thus electron emission characteristics may be deteriorated. Further, in view of design characteristics, when a diameter of a multi-walled carbon nano tube is formed in a very small size, a production process becomes complicated and a production cost largely increases. Therefore, it is preferable to adjust a diameter of the multi-walled carbon nano tube to the foregoing range.

Meanwhile, a single wall carbon nano tube may be used as the carbon nano tube 20. A diameter of the single wall carbon nano tube may be 1 nm to 2 nm. In view of design characteristics, when a diameter of the single wall carbon nano tube is too large, an aspect ratio thereof is deteriorated and thus electron emission characteristics may be deteriorated. That is, when the electron emission device 100 emits electrons, due to glow discharge and arc discharge by collision with remaining particles within a vacuum chamber, the electron emission device 100 may be damaged. Further, in view of design characteristics, when a diameter of the multi-walled carbon nano tube is too small formed, a production process becomes complicated and a production cost largely increases. Therefore, it is preferable to adjust a diameter of a single wall carbon nano tube to the foregoing range.

An average diameter of the metal tip 101 may be 400 nm to 600 nm. If the average diameter of the metal tip 101 is too small, upon emitting an electric field, the tip is damaged due to a high heat. In addition, if the average diameter of the metal tip 101 is too large, a current density is lowered. By adjusting the average diameter of the metal tip 101 to the foregoing range, electron emission efficiency of the electron emission device 100 can be maximized.

Figure 2:
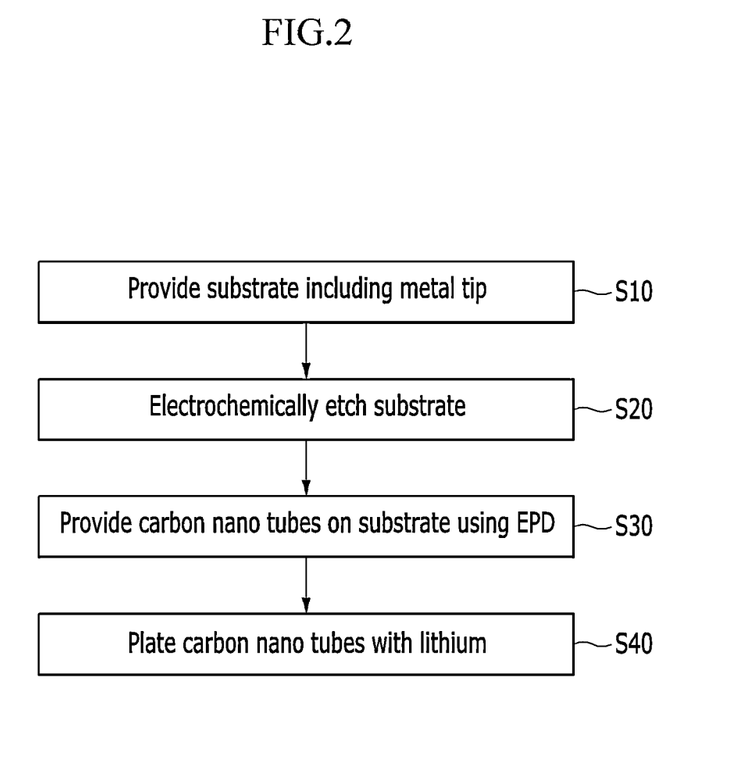
FIG. 2 is a flowchart illustrating a method of manufacturing the electron emission device of FIG. 1.

FIG. 2 is a flowchart illustrating a method of manufacturing the electron emission device 100 of FIG. 1. The method of manufacturing the electron emission device of FIG. 2 illustrates the present invention and the present invention is not limited thereto. Therefore, the method of manufacturing the electron emission device may be changed to other forms.

The method of manufacturing the electron emission device includes step of providing a substrate including a metal tip (S10), step of electrochemically etching the substrate (S20), step of providing carbon nano tubes on the substrate using electrophoretic deposition (EPD) (S30), and step of plating the carbon nano tubes with lithium (S40). In addition, a method of manufacturing an electron emission device may further include other steps.

First, a substrate including a metal tip is provided (S10). That is, a substrate having a cone type tip may be produced using a tungsten wire.

Next, the substrate is electrochemically etched (S20). That is, in order to attach carbon nano tubes by minutely adjusting a cone type tip, the substrate is electrochemically etched. Therefore, by reducing a width of the cone type tip, the cone type tip is more sharply formed.

Carbon nano tubes are provided on the substrate using EPD (S30). That is, by injecting carbon nano tube powder into a suspension and mixing the carbon nano tube powder and the suspension, and by injecting the substrate into the suspension and by applying a voltage, the carbon nano tubes may be attached to the cone type tip of the substrate.

Finally, the carbon nano tubes are plated with lithium (S40). The metal tip 101 (shown in FIG. 1) and the substrate 10 are together plated with lithium. Hereinafter, step S40 of FIG. 2 will be described in detail with reference to FIG. 3.

Figure 3:
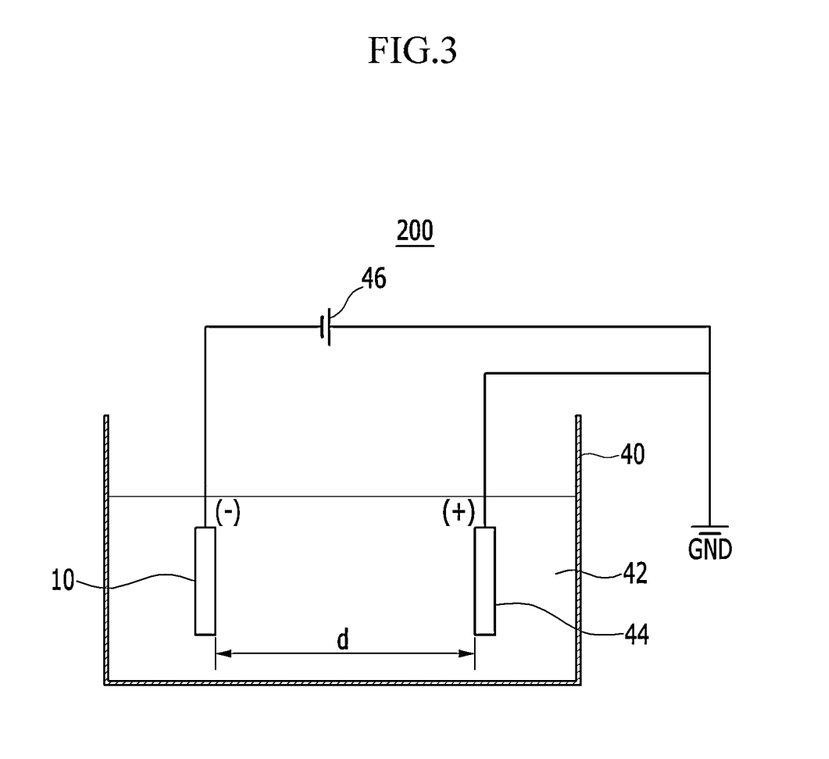
FIG. 3 illustrates a manufacturing apparatus of an electron emission device of FIG. 1.

FIG. 3 illustrates a manufacturing apparatus 200 of the electron emission device 100 of FIG. 1. In more detail, the manufacturing apparatus 200 of the electron emission device 100 of FIG. 3 illustrates an apparatus for plating carbon nano tubes with lithium at step S40 of FIG. 2.

Step of plating of carbon nano tubes with lithium using the manufacturing apparatus 200 of the electron emission device 100 of FIG. 3 includes i) step of providing a plating solution, ii) step of dipping a substrate in which carbon nano tubes are provided in a plating solution and providing the substrate as a negative electrode, iii) step of dipping a positive electrode including lithium in the plating solution, and iv) step of applying a voltage to the positive electrode and the substrate and plating the substrate with lithium. In addition, step of plating the carbon nano tubes with lithium may further include other steps, as needed.

First, as a plating solution 42 that is housed in a plating tank 40, a solution including ethylene carbonate (EC), diethyl carbonate (DEC), and lithium hexafluorophosphate ($LiPF_6$) may be produced. The substrate 10 may be efficiently coated with lithium using such a solution. The substrate 10 in which carbon nano tubes are provided is dipped in the plating solution 42. The substrate 10 is provided as a negative electrode. A positive electrode 44 is also dipped in the plating solution 42. Because the positive electrode 44 includes lithium, when connecting a power supply 46 to the positive electrode 44 and the substrate 10, while the positive electrode 44 is electrolyzed, the substrate 10 is coated with lithium. By applying a voltage to the positive electrode 44 and the substrate 10, the substrate 10 is plated with lithium.

Here, a distance d between the positive electrode 44 and the substrate 10 may be 10 mm to 30 mm. If a distance d between the positive electrode 44 and the substrate 10 is too large, the substrate 10 may not well plate with lithium. If a distance d between the positive electrode 44 and the substrate 10 is too small, spark may occur. Therefore, it is preferable to adjust a distance d between the positive electrode 44 and the substrate 10 to the foregoing range. The foregoing voltage may be 3V to 5V. If a voltage is too low, it is difficult to plate the substrate 10 with lithium. If a voltage is too high, the substrate 10 may be burned-out. Therefore, it is preferable to adjust a voltage to the foregoing range.

Meanwhile, a thickness of a lithium layer is proportional to a voltage applied time. That is, as a voltage applied time is extended, a thickness of a lithium layer that is formed by plating with lithium increases. For example, an increase rate of a thickness of the lithium layer may be 3 nm/s to 6 nm/s. If an increase rate of a thickness of the lithium layer is too small, an electron emission device may not be efficiently coated with lithium. In addition, if an increase rate of a thickness of the lithium layer is too large, a work function of an electron emission device may rather increase. Therefore, it is preferable to adjust an increase rate of a thickness of the lithium layer to the foregoing range.

It is preferable to adjust the foregoing voltage applied time to 3 second or less in order to reduce a turn-on electric field while reducing a work function of an electron emission device according to lithium coating. When a voltage applied time exceeds 3 seconds, a work function of an electron emission device increases and thus electron emission efficiency may be deteriorated. More preferably, it is preferable to adjust a voltage applied time to 2 second or less.

Hereinafter, the present invention will be described in detail through Experimental Example. Such Experimental Example illustrates the present invention and the present invention is not limited thereto.

Experimental Example

A substrate having a cone type tip that is formed with a tungsten wire having a diameter of 300 μm was produced. By electrochemically etching the substrate in a solution of KOH of 2 mol, a diameter of the cone type tip was adjusted to about 500 nm. Next, multi-layered wall carbon nano tubes having a diameter of 3 nm to 9 nm were deposited at the substrate using EPD. After carbon nano tube powder of 10 mg was washed with a ratio of one-to-one in a mixed solution of $HNO_3$ and $H_2SO_4$ for 5 hours, by injecting the carbon nano tube powder into a mixed solution of isopropyl alcohol of 50 ml and $Mg(NO_3)_2 6H_2O$ of 15 mg, a suspension was produced. After positioning the substrate as a negative electrode and positioning silicon as a positive electrode at the produced suspension, the carbon nano tubes were deposited on the tip with a DC voltage of 80V for 40 seconds. Here, a distance between the positive electrode and the negative electrode was fixed to 10 mm.

In a solution including ethylene carbonate (EC), diethyl carbonate (DEC), and lithium hexafluorophosphate ($LiPF_6$), the carbon nano tubes were coated in a lithium thin film through electroplating. In this case, a distance between a tip in which the carbon nano tubes that were used as a negative electrode was coated and lithium that was used as a positive electrode was fixed to 20 mm, and by applying a DC voltage of 4V and variously adjusting an applied time thereof, an electron emission device in which a lithium thin film of various thicknesses was coated was produced.

A micro shape of a cone type tip of a substrate that is included in an electron emission device that is produced using a field emission scanning electron microscopy (FE-SEM JSM-6330F, JEOL) and carbon nano tubes that were formed on the cone type tip were observed. A lithium thin film on the carbon nano tubes was observed using an X-ray photoelectric analyzer (XPS, Multi Lab 2000, Thermo). By using Keithley 248, which is a high voltage source and using Keithley 6517A, which is a current measurement unit, field emission characteristics of the carbon nano tube were measured. An effective work function of each carbon nano tube tip was obtained through direct measurement using a Kelvin probe (KP Technology, UK). An emission theory of Fowler-Nordheim was considered for calculating an electric field increase factor. While maintaining an initial emission current of the carbon nano tube tip to 10 μA or 100 μA, an electric field was continuously applied for 24 hours, and in order to evaluate electric field emission stability of the carbon nano tube tip, an emission current change was recorded every 10 minutes. In an actual X-ray system of radiation treatment or X-ray fluoroscopy, a cold cathode was mostly operated by pulse type bias for an ultra-short time period. Here, in order to correspond that a cold cathode has been used for at least 3 years, DC current bias has been continuously applied for 24 hours.

Experimental Example 1

By applying a DC voltage of 4V for 1 second, a lithium thin film was coated on carbon nano tubes.

Experimental Example 2

By applying a DC voltage of 4V for 2 seconds, a lithium thin film was coated on carbon nano tubes.

Experimental Example 3

By applying a DC voltage of 4V for 3 seconds, a lithium thin film was coated on carbon nano tubes.

Experimental Example 4

By applying a DC voltage of 4V for 4 seconds, a lithium thin film was coated on carbon nano tubes.

Experimental Example 5

By applying a DC voltage of 4V for 5 seconds, a lithium thin film was coated on carbon nano tubes.

Experimental Example 6

By applying a DC voltage of 4V for 10 seconds, a lithium thin film was coated on carbon nano tubes.

Experimental Example 7

By applying a DC voltage of 4V for 30 seconds, a lithium thin film was coated on carbon nano tubes.

Experimental Example 8

By applying a DC voltage of 4V for 60 seconds, a lithium thin film was coated on carbon nano tubes.

Comparative Example

An electron emission device having carbon nano tubes was produced. However, lithium was not coated on the carbon nano tubes. The remaining experiment processes, except for this are the same as those of the foregoing Experimental Example and therefore a detailed description therefore will be omitted.

Experimental Result of Field Emission Scanning Electron Microscopy

Figure 4:
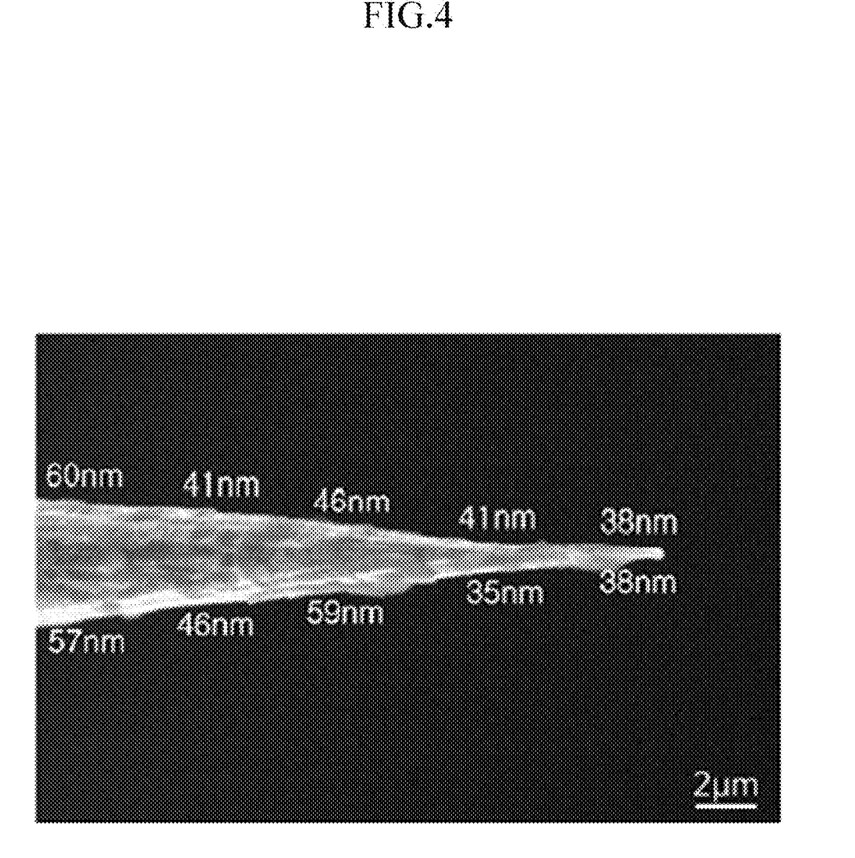
FIG. 4 is a field emission scanning electron microscopy photograph of a carbon nano tube tip that is produced according to Experimental Example 5 of the present invention.
Figure 5:
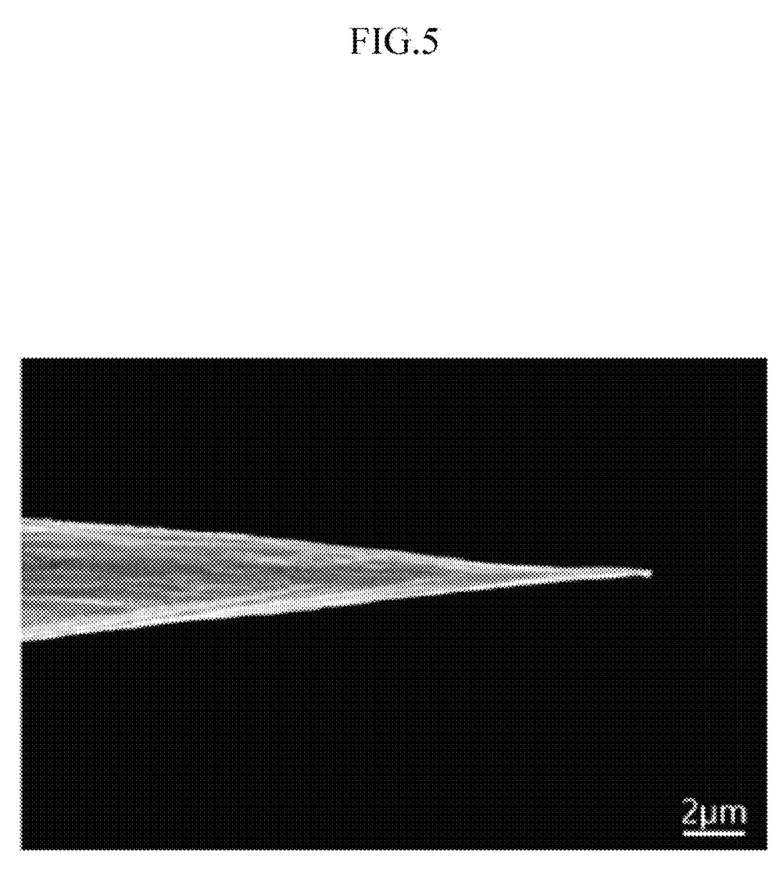
FIG. 5 is a field emission scanning electron microscopy photograph of a carbon nano tube tip after lithium of FIG. 4 is removed.

FIG. 4 is a photograph of a carbon nano tube tip that is produced according to Experimental Example 5, and FIG. 5 is a photograph after a carbon nano tube tip that is coated with lithium is dipped in an HF solution in order to remove lithium.

A thickness of a lithium layer that is coated on carbon nano tubes using Microsoft Office visio 2007 was calculated. A thickness of the lithium layer was measured at 10 random positions. A result thereof was shown in FIG. 4. As shown in FIG. 4, at a front end portion of a metal tip, a thickness of the lithium layer was a minimum. As shown in FIG. 5, when removing a lithium layer, carbon nano tubes having a flat surface were observed.

Experimental Result of Lithium Coating Thickness

Figure 6:
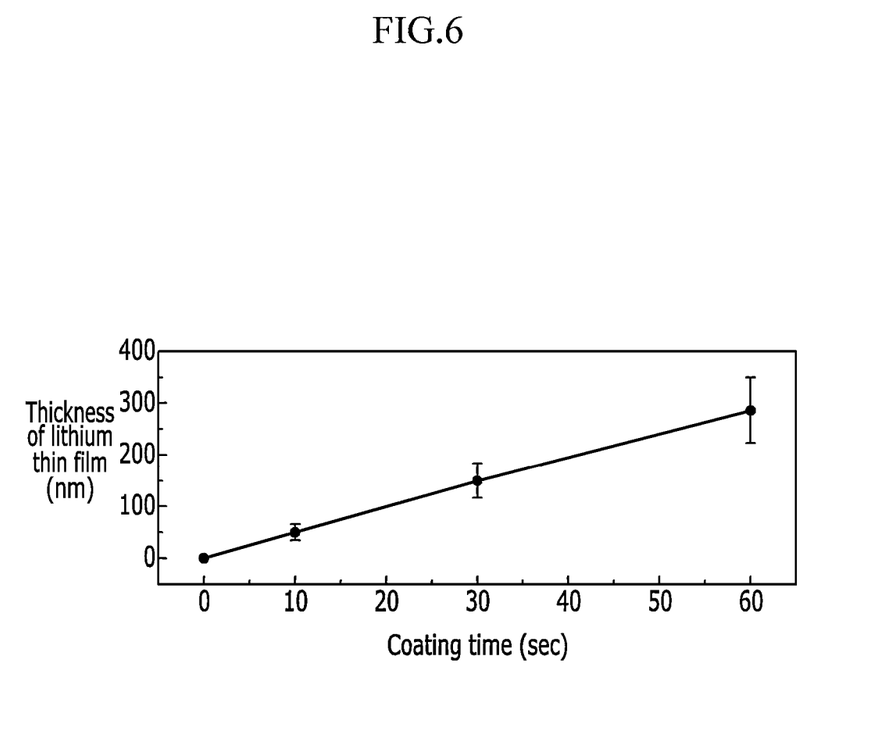
FIG. 6 is a graph illustrating a change of a thickness of a lithium layer of an electron emission device that is produced according to Experimental Examples 6 to 8.

FIG. 6 illustrates a change of a thickness of a lithium thin film of an electron emission device that is produced according to Experimental Examples 6 to 8.

As shown in FIG. 6, a thickness of a lithium thin film that is formed on carbon nano tubes was almost linearly increased according to a coating time. That is, in Experimental Examples 6 to 8, as a voltage applied time increases, an average thickness of a lithium thin film that is formed on the carbon nano tubes continuously increased, and a coating rate of the lithium thin film was about 4.7 nm/s.

Figure 7:
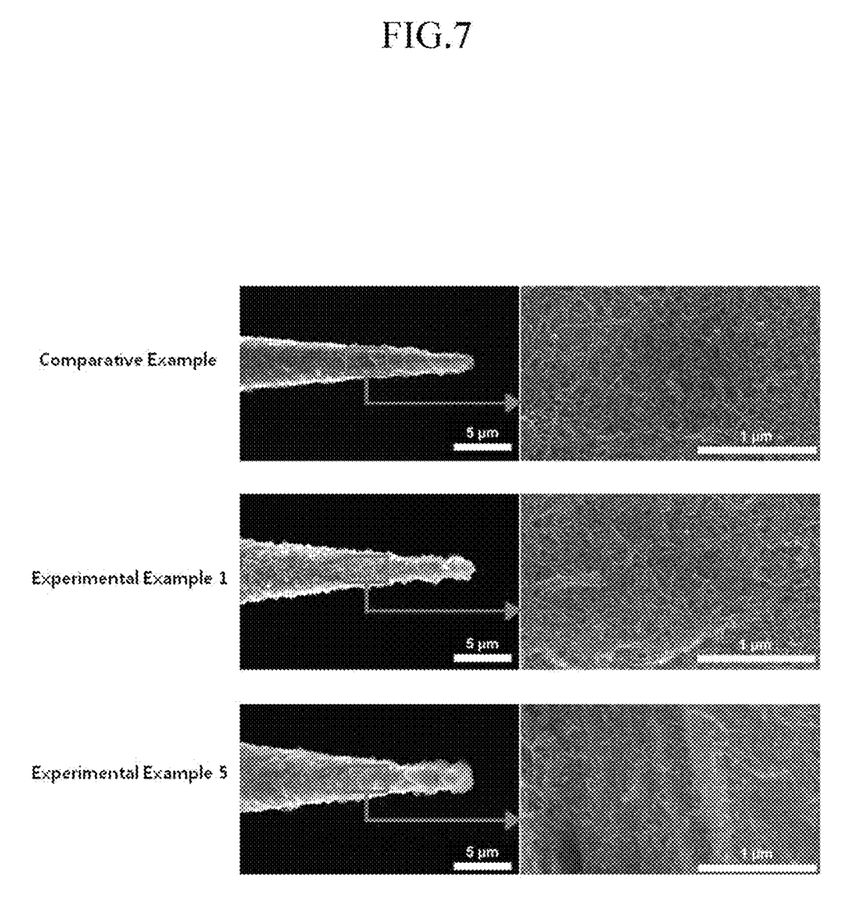
FIG. 7 is a field emission scanning electron microscopy photograph of an electron emission device that is produced according to Experimental Example 1, Experimental Example 5, and Comparative Example.

FIG. 7 illustrates an FESEM photograph of an electron emission device that is produced according to Experimental Example 1, Experimental Example 5, and Comparative Example. A right photograph of FIG. 7 is an enlarged photograph of a left photograph of FIG. 7. Experimental Examples 1 and 5 of FIG. 7 illustrate lithium that is coated on the carbon nano tube surface.

The carbon nano tubes of Experimental Example 1 were coated with lithium for only 1 second, which is a very short time and represented a tip end portion shape of almost the same form as that of Comparative Example. Meanwhile, in Experimental Example 5 having a somewhat large lithium thickness, a tip and a carbon nano tube were embedded in a lithium thin film.

Experimental Result of Determining Whether Lithium Exists

In order to determine whether a lithium thin film that is formed on the carbon nano tubes exists, XPS analysis of an electron emission device that is produced according to Comparative Example and Experimental Example 5 was performed.

Figure 8:
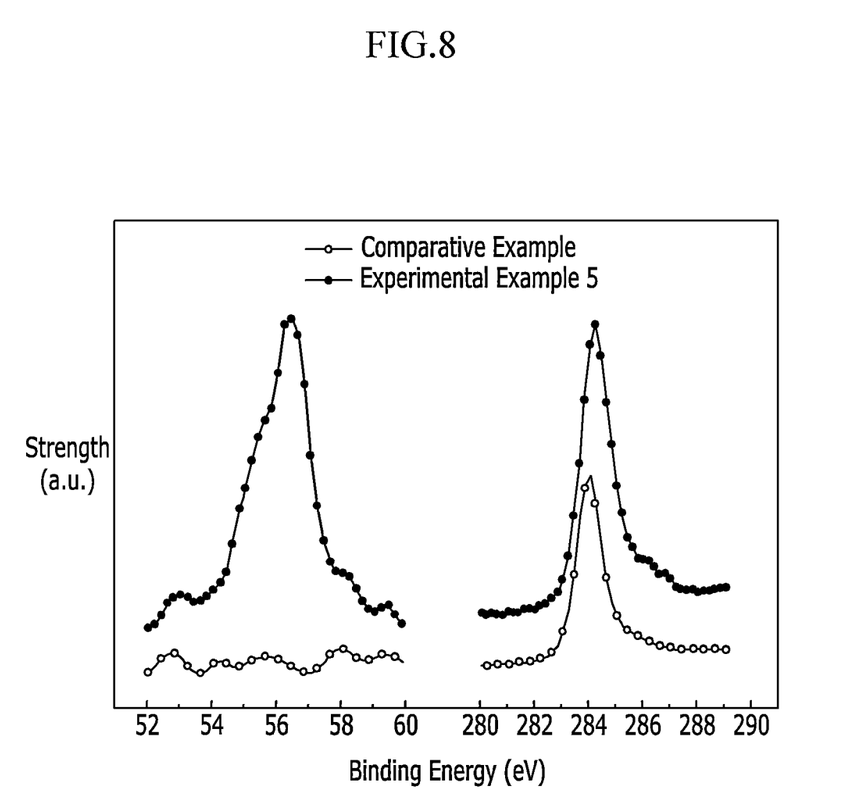
FIG. 8 is an XPS analysis graph of an electron emission device that is produced according to Comparative Example and Experimental Example 5.

FIG. 8 illustrates an XPS analysis result of an electron emission device that is produced according to Comparative Example and Experimental Example 5. The left side of FIG. 8 illustrates an Li 1s binding energy analysis result, and the right side of FIG. 8 illustrates a C 1s binding energy analysis result.

As shown in the right side of FIG. 8, different points did not exist between electron emission devices that are produced according to Comparative Example and Experimental Example 5 in the C 1s binding energy analysis. However, as shown in the left side of FIG. 8, in Experimental Example 5, due to Li 1s binding, a peak was observed at a periphery of 56 eV, but was not observed in Comparative Example in Li 1s binding energy analysis.

Experimental Result of Electric Field Emission Characteristic

Figure 9:
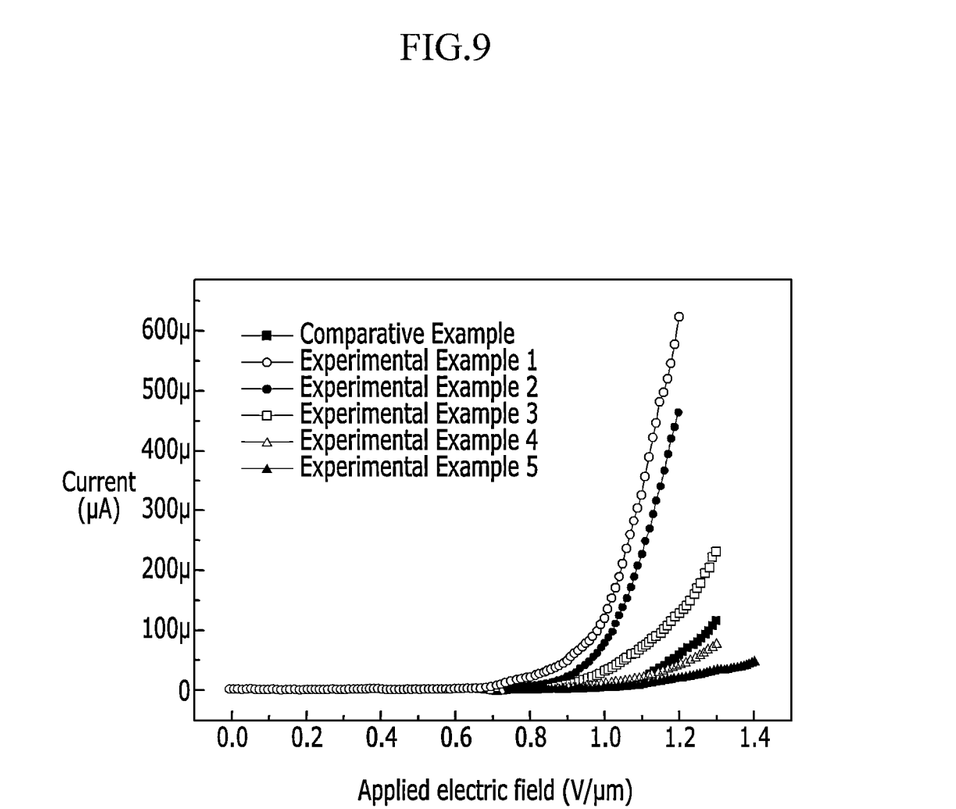
FIG. 9 is a graph illustrating field emission characteristics of an electron emission device that is produced according to Experimental Examples 1 to 5 and Comparative Example.

FIG. 9 illustrates field emission characteristics of an electron emission device that is produced according to Experimental Examples 1 to 5 and Comparative Example. Field emission characteristics of carbon nano tubes were different according to a thickness change of a lithium thin film. In a turn-on electric field $E_{on}$ that is defined as an electric field that is applied to obtain an emission current of 1.0 μA and in 1.2V/μm, when the same electric field is applied, an emission current $I_{CNT}$ that is obtained from the electron emission device was calculated. A calculation result thereof is represented in Table 1.

TABLE 1

| NO | $E_{on}$ (V/μm) | $I_{CNT}$ (μA) | K-P method φ (eV) | Δφ (eV) | F-N theory β | Δβ |
|---|---|---|---|---|---|---|
| Experimental Example 1 | 0.65 | 618 | 4.90 | ±0.001 | 9155 | ±1.9 |
| Experimental Example 2 | 0.75 | 460 | 4.91 | ±0.003 | 6749 | ±4.1 |
| Experimental Example 3 | 0.82 | 124 | 5.01 | ±0.005 | 4878 | ±4.9 |
| Experimental Example 4 | 0.86 | 40 | 4.93 | ±0.004 | 4508 | ±3.7 |
| Experimental Example 5 | 0.92 | 21 | 4.98 | ±0.001 | 4182 | ±0.8 |
| Comparative Example | 0.92 | 56 | 5.36 | ±0.005 | 12,220 | ±11.4 |

In Table 1, $E_{on}$ represents a turn-on electric field, $I_{CNT}$ represents an emission current in 1.2V/μm, φ and Δφ represent a work function, and β and Δβ represent an electric field concentration coefficient. As advancing from Experimental Example 1 to Experimental Example 5, while a lithium coating time increases, a turn-on electric field $E_{on}$ was monotonously increased, and an emission current $I_{CNT}$ was decreased. A turn-on electric field $E_{on}$ and an emission current $I_{CNT}$ in Comparative Example were 0.92V/μm and 56 μA, respectively. In Experimental Example 1, a turn-on electric field $E_{on}$ was greatly decreased to about 0.65V/μm, and in Experimental Examples 4 and 5, a turn-on electric field $E_{on}$ was similar to that of Comparative Example 1, but an emission current $I_{CNT}$ was lower than that of Comparative Example 1.

A work function φ and an electric field concentration coefficient β that are measured at an electron emission device of Experimental Examples 1 to 5 and Comparative Example were described in Table 1. In Comparative Example, a work function φ was measured as about 5.36 eV, and in Comparative Examples 1 to 5, a work function φ was decreased to about 4.90 eV to 5.01 eV. This means that a work function of carbon nano tubes efficiently decreases by lithium coating, and an electric field concentration coefficient β was $1.2\times10^4$ in Comparative Example, but was gradually decreased from about $9.2\times10^3$ of Experimental Example 1 to $4.2\times10^3$ of Experimental Example 5 according to increase of a lithium coating thickness. The reason why an electric field concentration coefficient β decreases according to increase of a lithium coating thickness is that a structural aspect ratio of carbon nano tubes is largely damaged according to increase of a lithium coating thickness, and this was determined from FIG. 7. That is, lithium thin film coating that is produced according to Experimental Example 1 represented a high emission current value even in a lower driving voltage due to a decreased work function φ while an aspect ratio damage decreases. However, in Experimental Example 5, because lithium coating is thick, much damage occurs in an aspect ratio, and even if a work function φ decreases, this increased an electric field concentration coefficient β and thus field emission characteristics were ultimately deteriorated.

Experimental Result of Emission Stability

Figure 10:
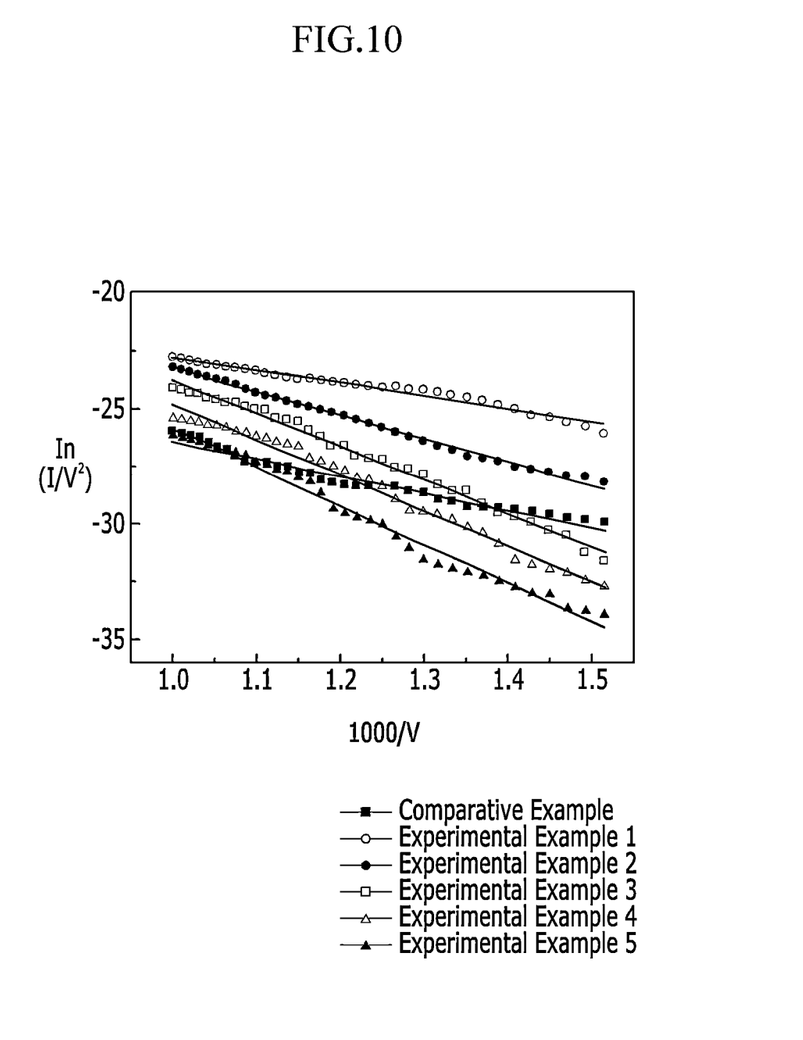
FIG. 10 is a graph illustrating an emission stability experiment result of an electron emission device that is produced according to Experimental Examples 1 to 5 and Comparative Example.

FIG. 10 illustrates an emission stability experiment result of an electron emission device that is produced according to Experimental Examples 1 to 5 and Comparative Example.

In an emission stability experiment of an electron emission device, an initial emission current was set to 10 μA under an applied electric field of 1.08V/μm or was set to 100 μA under an applied electric field of 1.24V/μm. In Comparative Example, when an initial current was set to about 10 μA, an emission current was almost equally maintained after 24 hours. However, when an initial current was set to about 100 μA, an emission current was greatly decreased to about 17% of an initial current after 24 hours. Alternatively, an electron emission device that is produced according to Experimental Examples 1 to 5 represented very stable emission characteristics even after a stability test in a high initial current of 100 μA. Particularly, in Experimental Example 3, in a high initial current of 100 μA, an emission current of about 98% was uniformly generated even after 24 hours. It was thought that this is because a lithium thin film on the carbon nano tube operates as a protection layer for preventing damage that is caused by electric field emission in a tip end portion and a collision of a gas that is ionized for a joule heating effect.

Figure 11:
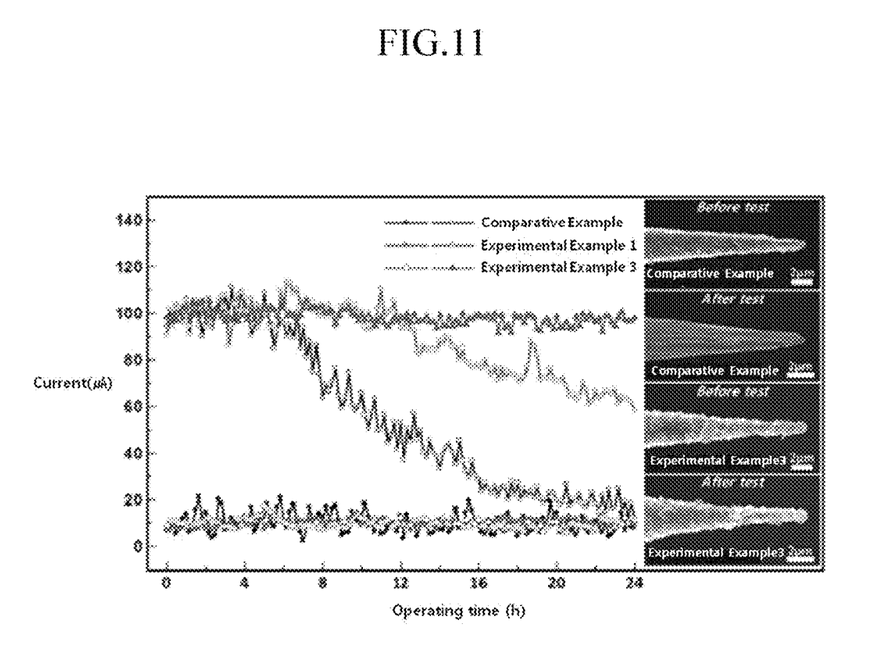
FIG. 11 is a graph and a field emission scanning electron microscopy photograph before and after a stability test of an electron emission device that is produced according to Experimental Example 1, Experimental Example 3, and Comparative Example.

FIG. 11 illustrates a result that measures an electron emission device that is produced according to Experimental Example 1, Experimental Example 3, and Comparative Example with FESEM before and after a stability test for 24 hours in an initial current of 100 μA.

As shown in FIG. 11, in an electron emission device that is produced according to Comparative Example, most of the carbon nano tubes of a tip end portion were separated from the substrate, and after a stability test, an edge of a tip substrate was melted by a joule heat. This can be known from a phenomenon that a current greatly reduces according to an operation time. Even after 24 hours, because most of the carbon nano tubes stick to the substrate, an electron emission device of Experimental Example 3 maintained an initial cone type shape.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electron emission device, comprising:
   a substrate comprising a metal tip;
   carbon nano tubes that are positioned on the metal tip; and
   a lithium layer that is positioned on the carbon nano tubes.

2. The electron emission device of claim 1, wherein the lithium layer has an average thickness of 4 nm to 5 nm.

3. The electron emission device of claim 2, wherein a value of a thickness of the lithium layer at a to end portion of the metal tip is less than values of thicknesses of the lithium layer at other portions of the metal tip.

4. The electron emission device of claim 3, wherein a thickness of the lithium layer at a base end portion of the metal tip is greater than the thickness of the lithium layer at the top end portion of the metal tip.

5. The electron emission device of claim 1, wherein the lithium layer has an average thickness of 4.6 nm to 4.7 nm.

6. The electron emission device of claim 1, wherein the carbon nano tubes have a diameter of 10 nm to 15 nm, when the carbon nano tubes are a multi-walled carbon nano tube.

7. The electron emission device of claim 1, wherein the carbon nano tubes have a diameter of 1 nm to 2 nm, when the carbon nano tubes are a single wall carbon nano tube.

8. The electron emission device of claim 1, wherein the metal tip has an average diameter of 400 nm to 600 nm.

9. A method of manufacturing an electron emission device, the method comprising:
   providing a substrate comprising a metal tip;

electrochemically etching the substrate;
providing carbon nano tubes on the substrate using electrophoretic deposition (EPD); and
plating the carbon nano tubes with lithium.

10. The method of claim 9, wherein the plating of the carbon nano tubes with lithium comprises:
providing a plating solution comprising ethylene carbonate (EC), diethyl carbonate (DEC), and lithium hexafluorophosphate ($LiPF_6$);
dipping a substrate in which the carbon nano tubes are provided in the plating solution and providing the substrate as a negative electrode;
dipping a positive electrode comprising lithium in the plating solution; and
applying a voltage to the positive electrode and the substrate and plating the substrate with lithium.

11. The method of claim 10, wherein at the plating of the substrate with lithium, a distance between the positive electrode and the substrate is 10 mm to 30 mm, and the voltage is 3V to 5V.

12. The method of claim 11, wherein a thickness of a lithium layer that is formed by plating with the lithium is proportional to the voltage applied time.

13. The method of claim 12, wherein the voltage applied time is 3 seconds or less.

14. The method of claim 13, wherein the voltage applied time is 2 seconds or less.

15. The method of claim 12, wherein an increase rate of a thickness of the lithium layer is 3 nm/s to 6 nm/s.

* * * * *